M. G. McGUIRE.
CUSHIONING MEANS FOR VEHICLES.
APPLICATION FILED AUG. 2, 1913.
1,112,714.
Patented Oct. 6, 1914.
2 SHEETS—SHEET 2.
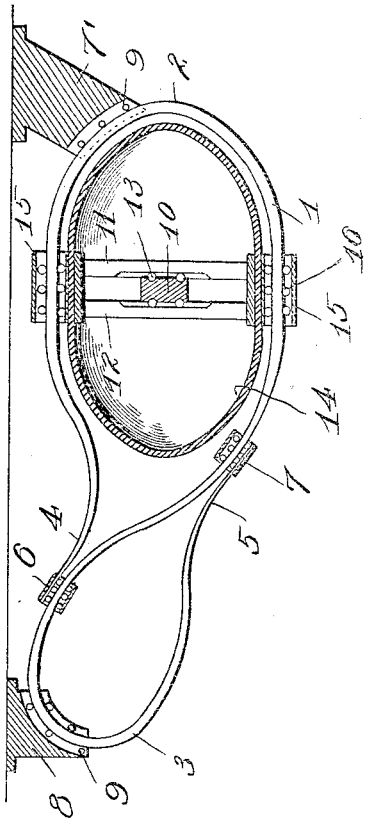
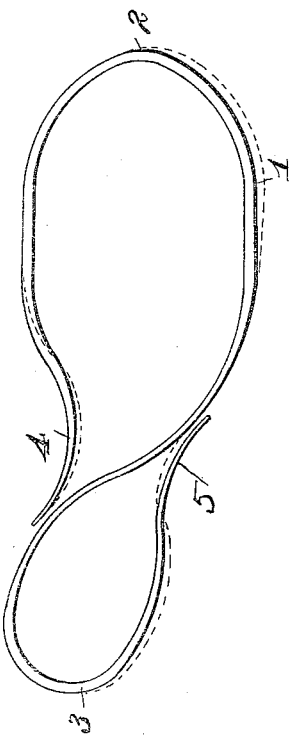
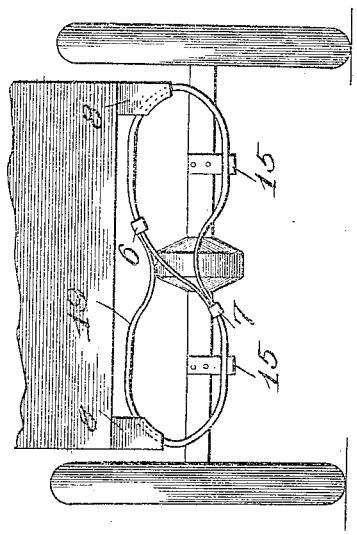
Witnesses:
Inventor,
M. G. McGuire
By
Attorney.

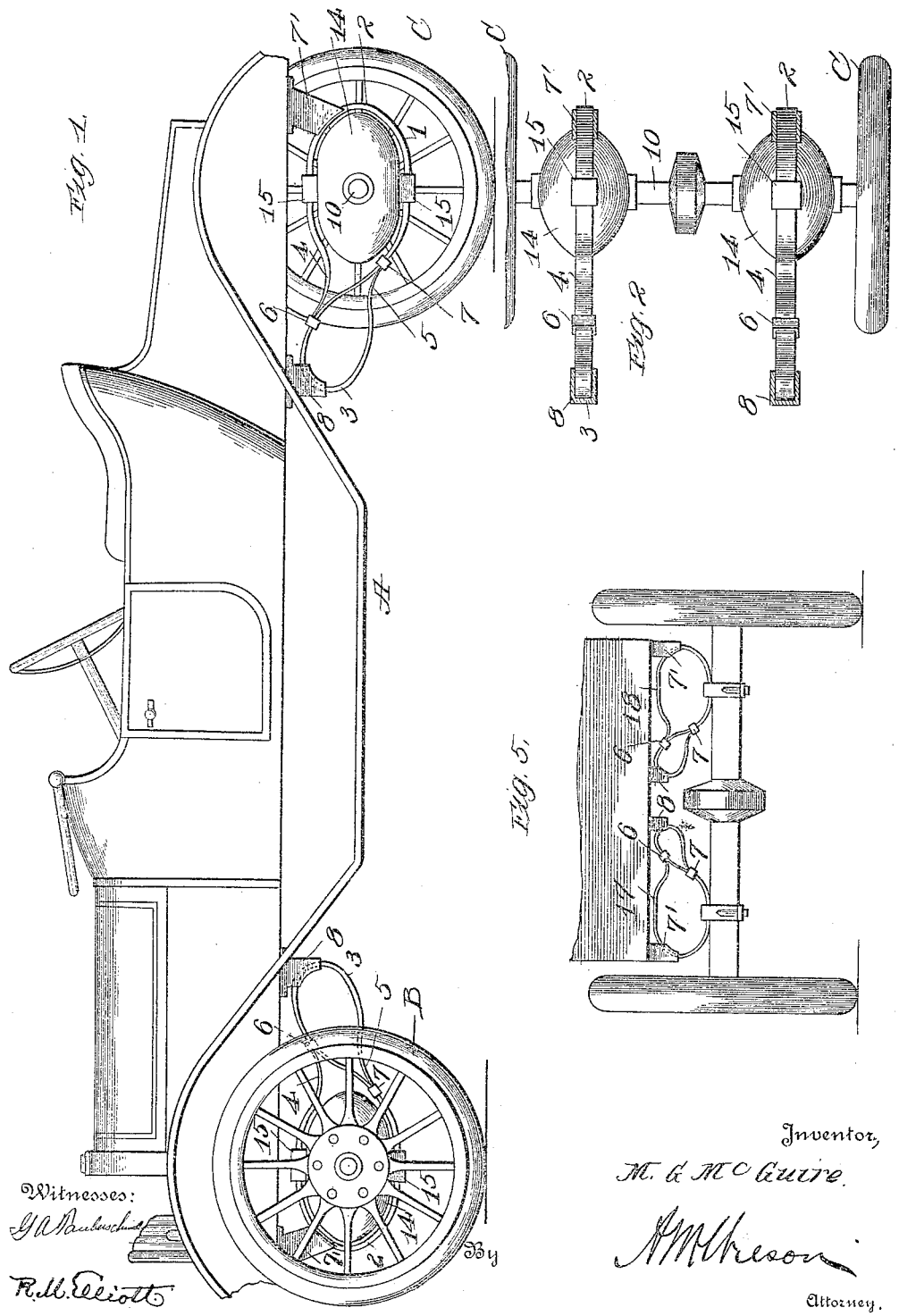

UNITED STATES PATENT OFFICE.

MICHAEL G. McGUIRE, OF CHICAGO, ILLINOIS.

CUSHIONING MEANS FOR VEHICLES.

1,112,714.  Specification of Letters Patent.  Patented Oct. 6, 1914.

Application filed August 2, 1913. Serial No. 782,625.

*To all whom it may concern:*

Be it known that I, MICHAEL G. McGUIRE, a citizen of the United States, and residing at Chicago, in the county of Cook and State of Illinois, have invented certain new and useful Improvements in Cushioning Means for Vehicles, of which the following is a specification.

This invention relates to cushioning devices for vehicles, more specifically for automobiles, and constitutes an improvement upon a structure of this character patented by me October 10, 1911, #1,005,449.

The object of the present invention is in a ready practical manner so to float or resiliently support the axle of the vehicle as to prevent transmission to the body of the vehicle of any shocks or jars resulting from road obstructions, and further to adapt the improvement for application to an existing machine without requiring any extended change in its structure.

With the above and other objects in view as will appear as the nature of the invention is better understood, the same consists in the novel construction and combination of parts of an axle cushioning means for vehicles, as will be hereinafter fully described and claimed.

In the accompanying drawings forming a part of this specification, and in which like characters of reference indicate corresponding parts: Figure 1 is a view in side elevation exhibiting an automobile having its axles equipped with the improvements of the present invention. Fig. 2 is a top plan view of the rear portion of the vehicle. Fig. 3 is a view in side elevation, partly in section, showing more particularly the manner in which the cushioning spring is supported from the chassis of the machine. Fig. 4 is a view in the nature of a diagram exhibiting the range of flexion of the cushioning spring. Fig. 5 is a view in rear elevation of one modified form of the invention. Fig. 6 is a similar view of another modified form of the invention.

Referring to the drawings, A designated generally, the body of the vehicle, B, the front wheels, and C the rear wheels. These parts may be of the usual or any preferred construction, and therefore need no further description other than to say that the tires of the front and rear wheels may be either of the pneumatic or cushion type, the latter being preferred, inasmuch as the arrangement of the cushioning spring hereinafter to be more fully described, will operate in such manner as to absorb all shocks and jars and thus eliminate the necessity of the employment of the pneumatic tire.

The gist of the present invention resides in so supporting the axles at the front and rear of the machine that they shall be floated,—that is to say, shall be free to yield vertically and longitudinally to compensate for road inequalities, such yielding being of a character that will not cause any jar or impact to be transmitted to the body of the vehicle and thus to the occupants. This result is secured by the employment of what may be termed an approximately 8-shaped spring, the terminal bends of which are supported or secured by brackets from the under side of the chassis of the machine, such brackets having combined with them roller or ball bearings, thus to insure free yielding of the spring without appreciable friction. The axle is arranged to slide between parallel arranged bars, the upper and lower ends of which are secured in any suitable manner to the springs, the means for securing the axle guiding bars to the spring serving also as a means for retaining in position a cushioning member, preferably of the pneumatic type, such as shown in the patent referred to.

Usually, two cushioning springs will be combined with each of the axles, and will extend longitudinally of the vehicle body; but if preferred, and as shown in Figs. 5 and 6, these springs may be disposed transversely of the body, two springs being shown in Fig. 5, and a single spring shown in Fig. 6.

With the above general statement, an understanding of the invention will be rendered clear by the following detailed description.

Referring to Figs. 1, 2, 3, and 4, there is shown a cushioning spring combined with the front and rear axle, two on both axles, and as the construction of each is identical with the other, a description of one will serve for all. The spring 1 is of substantial panduriform contour, the larger loop 2 of which is designed to occupy substantially a horizontal plane, while the smaller loop 3 is disposed obliquely to the loop 2. The terminals 4 and 5 of the spring are disposed within clips 6 and 7, these clips embodying ball or roller bearings, in order to permit the terminals freely to ride upon the adjacent spring member. The larger loop 2 is secured within a hanger or bracket 7' depending from the chassis of the machine, a similar hanger 8 being employed to house the bend of the smaller loop 3, and each of these hangers includes ball or roller bearings 9, thus to permit ready yielding of the springs in every direction, and to enable them to absorb shocks and jars incident to road obstructions and to prevent transmission of such jars to the occupants of the vehicle.

The axle 10 is arranged to slide vertically between two bars or guides 11 and 12, roller bearings 13 being provided to reduce friction between the bars and the axle to the minimum, the arrangement being the same as that shown in the patent referred to. The cushioning element or member 14 which is of pneumatic type, as disclosed in the patent referred to, is secured to the larger bend of the spring by clips 15, which also include roller or ball bearings 16 to reduce friction to the minimum.

As will be obvious, under pressure, the tendency of the springs will be to flatten or yield longitudinally, so that at their points of connection with hangers 7' and 8, a parabola will be formed and this will be maintained under all conditions in use by the co-action between the members of the hanger and the bends of the spring.

As shown in Fig. 1, two springs such as described are employed in connection with the front and rear axles, and these are disposed longitudinally of the vehicle body; but if preferred and as shown in Fig. 5, two springs 17 and 18 may be employed, which are disposed transversely of the body, or a single spring 19 as shown in Fig. 6 may be utilized, the general construction of which corresponds to that shown in Figs. 3 and 4.

With the arrangement shown and described, should the front or the rear wheels contact with an obstruction, the resulting jar or shock will be absorbed, by the cushioning element 14 and the springs, so that no impact will be transmitted to the body of the vehicle, resulting thereby in a smooth running and jar-free road machine. It will be noted by the manner in which the terminals of the springs are disposed and the direction in which pressure is exerted on the springs, that the latter, under compression, will not be elongated, thereby securing, under all conditions of use, a ready response to yielding and a more equal resilient action than would result if the springs elongated, as the ordinary elliptical springs in common use. In other words, as a result of this construction, the spring under pressure compresses but is held against elongation, the overlying terminals of the springs sliding freely to permit compression and as freely sliding in the reverse direction upon the pressure being relieved, the spring expanding from the compressed to the normal condition. By reason of the spring being thus held against elongation the return of the same to normal position is wholly without jar or any rebound action. I desire also to call attention to the fact that although the spring herein shown is of the single leaf type, yet I do not desire to limit myself to the employment of this type of spring as obviously a spring of multiple leaves may be employed, and with a spring of such type it will be obvious that the clips 6 and 7 serve to hold the leaves against separation, rendering unnecessary the clips usually employed for this purpose.

What is claimed as new is:—

1. An axle cushioning spring for vehicles, embodying approximately 8-shaped members arranged to exert resistance in opposite directions with a force to neutralize a distorting factor, the terminals of the members being arranged to overlie the intermediate bend and held assembled therewith for sliding movement thereon, and means for maintaining constant the vertex of a parabola formed by the spring support.

2. An axle cushioning spring for vehicles embodying approximately 8-shaped members exerting resistance in opposite directions commensurate with a distorting force presented by an obstructive factor, the terminals of the springs being arranged for sliding movement on the intermediate bend, and means for maintaining constant the bends of the springs in use.

3. An axle cushioning spring for vehicles embodying approximately 8-shaped members exerting resistance in opposite directions commensurate with the opposition presented by an obstructive factor, the terminals of the members being in contact with the intermediate bend and having sliding movement thereon, and clips shaped to conform to the curvature of the spring members for maintaining constant the bends of the spring against a distorting force in use.

In testimony whereof I affix my signature in presence of two witnesses.

MICHAEL G. McGUIRE.

Witnesses:
R. M. ELLIOTT,
BENNETT S. JONES.